Nov. 15, 1932.  J. H. OWENS  1,887,889

PIPE HANDLING TOOL

Filed Sept. 2, 1930   2 Sheets-Sheet 1

Inventor:
John Henery Owens
BY George I. Haight

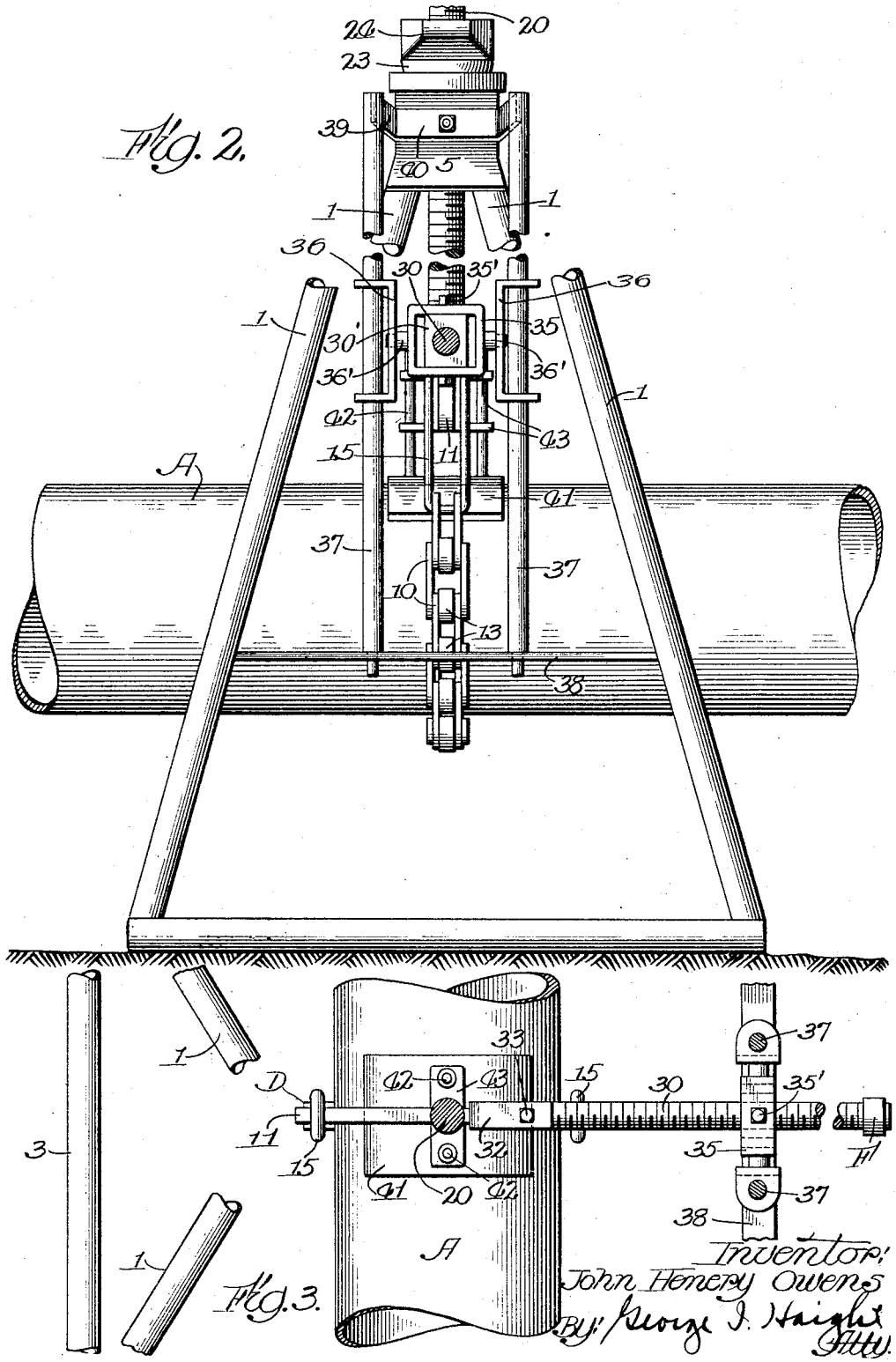

Patented Nov. 15, 1932

1,887,889

UNITED STATES PATENT OFFICE

JOHN HENRY OWENS, OF ELGIN, ILLINOIS

PIPE-HANDLING TOOL

Application filed September 2, 1930. Serial No. 479,381.

In laying pipe lines for high pressure systems of distribution, it is the practice to employ lengths of steel pipe placed end to end and joined by welding. Usually a butt weld is made at the joints, and in order to make a proper joint it is necessary to carefully and accurately match the abutting ends by axially aligning the pipe lengths in a straight line so that the ends meet in contact around the entire circumference of the pipe ends and leave no crevices or openings; otherwise, the flux used in welding flows through the crevices into the pipe and forms undesirable obstructions which have to be removed under considerable difficulty and additional expense.

The practice now is to lay the pipe lengths on the ground alongside the trench in which the pipe line is to be buried, and then start at one end of the line, aligning the adjoining ends of the pipe lengths and completing the joints in succession until a long line of pipe lengths are joined, whereupon the assembled structure is rolled into the trench.

Under the present practice, as each joint is made it is necessary to block up the pipe lengths in an effort to line up the ends and to permit the line to be rolled as the joint is being welded, so that the welder can work on the top side of the joint. Each pipe length added to the line makes the whole line increasingly difficult to handle until eventually a new line must be started. Under this method, not only are the sections difficult to line up, but a considerable number of men are required to roll the line for the welder.

The object of my invention is to eliminate the difficulties of the present practice by the provision of a tool which will support pipe for rotation about its own axis and which will accurately and quickly align the sections to be joined, my object being further to provide a tool of this character which can be quickly and easily connected with, and disconnected from, the pipe, accurately and universally adjusted to the point of precision in aligning the sections and capable of being conveniently moved from place to place and manipulated by one man.

Other objects of my invention will appear hereinafter.

Referring to the accompanying drawings,

Fig. 2 is a view in side elevation of said structure;

Fig. 3 is a horizontal section substantially on the line 3—3 of Fig. 1; and

Figures 1, 4:
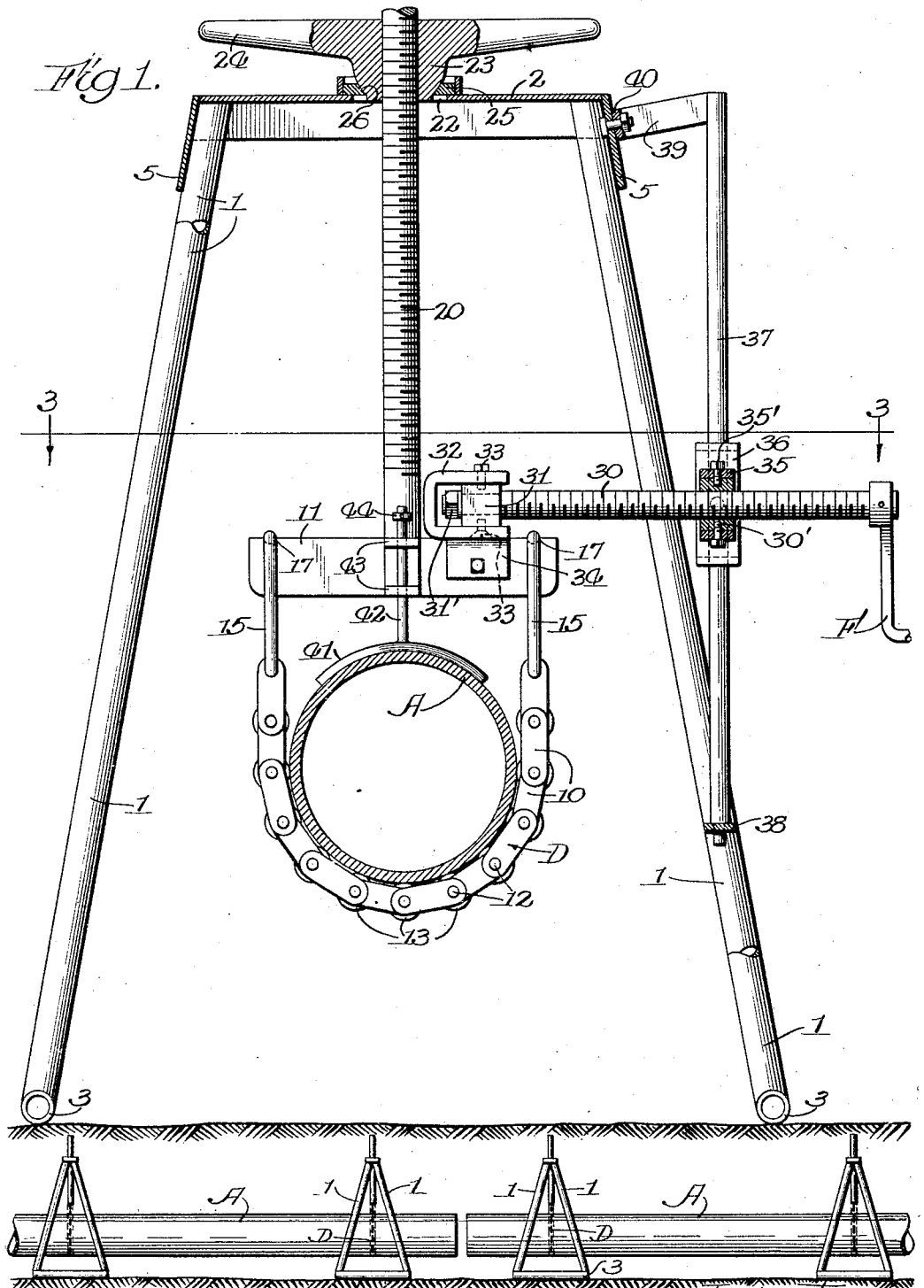
Fig. 1 is a vertical section of a pipe-handling tool embodying my invention, the pipe being also shown in section.
Fig. 4 is a diagrammatic view illustrating the disposition of several of these tools in aligning two pipe lengths preparatory to the operation of welding the pipe lengths together.

The structure shown in the drawings is intended to straddle the pipe and it has a frame or standard comprising in general two upright standards or frames, each formed of two legs 1, and a cross or top yoke or member 2 joining the upper ends of the legs. The lower ends of the legs are joined by horizontal foot members 3. The foot members 3 of the standards are parallel with each other in the direction of the axis of the pipe being handled. Each standard is triangular in shape by reason of the fact that the legs 1 are converged upwardly toward each other so that they serve not only as supports but as diagonal braces as well, thus providing a rigid structure, light in weight and at the same time capable of sustaining heavy loads. The elongated foot members 3 provide long bearing contact upon the ground and prevent the structure from tipping longitudinally, that is, in the direction of the axis of the pipe being handled.

The standards are brought closer together at their upper ends than at their lower ends, so that a short cross-beam or yoke 2 may be used for sustaining great weight. The lower ends of the standards, however, are sufficiently far apart to prevent tipping of the structure in a lateral direction. The legs and foot members may be made of tubular construction and joined to each other by welding so as to form, in effect, an integral structure. The cross or top beam member may be formed as an inverted channel with its ends 5 turned down over the upper ends of the legs and welded thereto to form a rigid structure.

The pipe A is suspended in the frame by means of a pipe-holding member which is in the form of a flexible chain D supported at its ends by a cross-head 11 and looped downwardly around the pipe so that the pipe rests in the bight of the loop. The chain is made up of a plurality of links 10 pivotally connected together by the pins 12, and anti-friction roller bearings 13 are mounted on these pins between the respective links so that collectively the rollers form a bearing upon which the pipe is supported and which permits the rotation of the pipe about its longitudinal axis. The use of a chain with roller bearings of this type reduces the friction incident to the rotation of the pipe to a minimum, with the result that one man can, with the aid of chain tongs, rotate a long line of joined pipe sections. The ability to rotate the pipe about its own axis enables the welder to maintain the welding operation on the top side of the pipe line throughout the entire rotation of the joint.

The ends of the chain are provided with elongated end links 15, between the side members of which the cross-head 11 is inserted, as shown more clearly in Fig. 1. The end links 15 engage in notches 17 in the upper edge of the cross-head, thus forming a flexible or pivotal connection between the end links and the cross-head. These connections are easily detachable, however, by lifting the end links upwardly till they clear the slots, whereupon the end links may be removed from the cross-head. In this manner, the chain may be quickly and easily looped around the pipe and mounted in position to suspend the pipe. Furthermore, the chain structure readily adapts itself to different size pipes to be handled.

The cross-head 11 is rigidly fastened to the lower end of a suspension member 20. The suspension member 20 is in the form of a threaded rod which extends upwardly through an opening 22 in the cross-beam 2 of the frame, and is threaded through a large nut 23 having oppositely extending handle members 24 by which the operator may conveniently rotate the nut. By rotating the nut 23, the pipe section suspended in the chain loop may be raised or lowered vertically throughout a considerable range of movement and thus it can be very accurately adjusted vertically with respect to the end of another section of pipe to which it is to be joined. The nut 23 is supported by the cross-member 2 of the frame by means of the ball and socket type of connection, so as to form a swivel about which the suspension member and the chain loop may be swung.

This provides for a universal movement of the pipe horizontally, either in a direction longitudinally of the pipe axis or laterally thereof, so that the end of the pipe may be brought into exact aligned and abutted relation with respect to another pipe section to which it is to be joined. To form this swivel connection, the cross-beam 2 supports a bearing ring 25 surrounding the opening 22 and having a socket portion 26 formed on its upper side. The lower end of the nut 23 is correspondingly formed as a ball to fit this socket.

In order to provide an accurate lateral adjustment corresponding to the vertical adjustment of the screw suspension member 20, a horizontally disposed screw 30 is provided. The inner end of this horizontal screw is rotatable in a bearing block 31 which itself is horizontally rotatable in a yoke 32 about a vertical axis which is formed by means of the pivot bolts 33 mounted in the ends of the yoke 32. The end portion of the screw member 30 which extends through the bearing block 31 to form a shoulder, and the extended end, is provided with a collar and nut 31' whereby the screw member is anchored to the block and is capable of rotation. The yoke itself is provided with down-turned flanges 34 which overlie the cross-head 11 and are bolted thereto. In like manner, the outer end of the horizontal screw 30 is threaded through a nut 30' which is rotatably mounted on a vertical axis in a rectangular box-like frame 35, and the frame 35 itself is rotatable on a horizontal axis on two guide yokes 36. The vertical axis of this nut is formed by the pivot pins 35' and the horizontal axis for the frame 35 is formed by the pivot lugs 36' which are mounted in bearings in the guide yokes 36. The guide yokes 36 are slidable vertically on the pair of vertically disposed parallel guide rods 37, the horizontal legs of these yokes being provided with holes through which the guide rods extend. The lower ends of the guide rods are supported by a horizontal cross-bar 38 extending between and fastened to the legs 1 of the frame standard. The upper ends of the guide rods are fastened to the free ends of the arms 39 of a V-shaped bracket 40 which is securely bolted in fixed position on the end flange 5 of the cross-beam 2, these arms 39 being extended outwardly sufficiently to maintain the guide rods in substantially vertical position.

The swivel connections of the screw 30 with the cross-head 11 and with the frame provide for universal movement of the screw 30 to accommodate it to the universal movement of the pipe suspension mechanism. The slidable connection of the frame 35 with the guide rods permit the screw to remain in substantially horizontal position and at the same time follow the vertical adjustment of the pipe throughout the range of vertical adjustment of the suspension member. The outer end of the horizontal screw 30 is provided with a hand crank F by which it may be conveniently rotated.

The pipe sections adapted to be handled by this structure are comparatively heavy, and when a pipe section is in the flexible suspension loop D it offers considerable resistance to lateral movement for adjustment purposes on account of its weight and the fact that one end may already be attached to the line of pipe being formed. In order, therefore, to prevent any relative movement horizontally between the cross-head 11 and the pipe A due to the flexibility of the chain suspension loop D when the screw 30 is operated, I provide an arc-shaped foot or member 41 which rests upon the top side of the pipe and which is provided with upstanding guide rods 42 on each side of the cross-head 11. These guide rods are vertically slidable in suitable bearings in outstanding lugs 43 on the cross-head 11, so that the arc-shaped foot will be vertically movable to adjust it to pipes of different diameter. However, the lugs 43 and guide rods 42 rigidly hold the foot member against lateral movement and serve as a rigid connection between the cross-head 11 and the pipe A. The foot member embraces a considerable arcuate portion of the pipe and thus transmits lateral movement of the cross-head directly to the pipe; hence, when the screw 30 is operated for the purposes of lateral adjustment, this adjustment is reflected directly in the pipe and the pipe will thereby be laterally moved in response to the operation of the screw 30. The upper ends of the guide rods 43 are threaded and provided with removable nuts 44 which prevent the shoe from dropping down upon the removal of a pipe from the suspension loop. The foot member 41 is thus readily removable from the guide lugs by simply removing the nuts 44; hence, separate foot members curved to different size pipes may be provided or a single foot member may be used, arranged to make contact with the pipe at the separated points on the periphery thereof.

Thus, it is evident that by rotation of the horizontal screw 30 in either direction the chain loop can be shifted or adjusted laterally in either direction while maintained at a definite height by means of the adjustment hereinbefore described in connection with the suspension member 20. The result of this construction is that the structure provides a tool by which the pipe handled thereby can be accurately moved and adjusted universally in any direction necessary to bring the end of the pipe into accurate position relatively to another section of the pipe to which it is to be joined.

In practice, when two lengths A, A of pipe, as illustrated in the diagrammatic view in Fig. 4, are to be joined together end to end, one of these pipe-handling tools are provided for each pipe length adjacent the ends to be joined, and one provided for each length adjacent the opposite ends. The pipe lengths are generally lying on the ground in successive order in the position in which they are distributed by the trucks which bring the pipes to the job. The tools are positioned as above described and the roller-bearing chain loops are placed around underneath the pipes and their end links hooked on the cross-head 11. The foot member 41 is dropped down upon the top side of the pipe. The operator then turns the suspension screw 20 to raise the pipes off the ground until their ends are vertically aligned. At the same time, the operator may rotate the horizontal screw 30 to shift one or both of the pipe sections laterally until their ends are aligned in a lateral direction. If necessary, the pipe lengths may be moved longitudinally slightly to bring their aligned ends into contact, this movement being permitted by the universally adaptable connections of the vertical and horizontal screw members with the frame and cross-head.

After the pipes have thus been carefully and accurately aligned in this manner, the welder can start the welding operation on the top side of the pipe, and as he continues the welding of the joint throughout the entire circumference thereof, the pipe can be rotated about its own longitudinal axis to maintain the welding position on the top side of the pipe convenient for the welder. After a joint is thus welded, the tools are moved to corresponding relation at the next joint to be made. In this manner, a large number of sections may be joined together, one at a time, to form a long line of continuous pipe. Even after a large number of lengths have been thus welded together, the entire line of pipe may be very easily rotated about its own axis and the work can be very rapidly done with the minimum amount of manual labor necessary to manipulate the pipe. The foot member 41 rests of its own weight upon the pipe while the pipe is being rotated, but does not offer sufficient frictional resistance to interfere with the free and easy rotation of the pipe in its chain loop. Each of these tools are constructed to sustain the great weights of pipe, and at the same time they are sufficiently light in weight to be shifted by one man from place to place along the line.

It is obvious that changes may be made in the construction, operation and arrangement of the parts, without departing from the scope and spirit of the invention, and I contemplate such changes as may fairly fall within the scope of the appended claims.

I claim:

1. In a tool of the class described, the combination of a supporting standard, a pipe-holding member in which the pipe is freely rotatable about its axis, suspended from said standard and vertically and laterally adjustable therein, and means connected between said standard and said holding member for shifting said holding member to adjust said holding member vertically and laterally.

2. In a tool of the class described, the combination of a supporting standard, a pipe-holding member suspended from said standard and vertically and laterally adjustable therein, means connected between said standard and said holding member for adjusting said holding member vertical and laterally, and means supporting the pipe in said holding member for free axial rotation of the pipe.

3. In a tool of the class described, the combination of a supporting standard comprising legs and a cross top member, a suspension member swingingly depending from said cross member between said legs and vertically adjustable, a pipe-holding loop on said suspension member having means for supporting a pipe for free axial rotation, and means for adjusting said loop laterally.

4. In a tool of the class described, the combination of a supporting frame, a chain loop suspended in said frame for supporting a pipe in the bight thereof, means for raising or lowering the loop for adjusting the relative position of the pipe in a vertical direction, and means connected with said frame and loop for shifting the loop laterally for adjusting the pipe in a horizontal direction.

5. In a tool of the class described, the combination of a supporting frame, a chain loop suspended in said frame for supporting a pipe in the bight thereof, means connected with said frame and loop for raising or lowering the loop for adjusting the relative position of the pipe in a vertical direction, means for shifting the loop laterally for adjusting the pipe in a horizontal direction, and a bearing member on said chain loop upon which the pipe can be rotated axially of itself in the loop.

6. In a tool of the class described, the combination of a supporting frame, a bearing member adaptable to different size pipe mounted in said frame and having bearings on which the pipe is rotatable on its axis, means for raising or lowering said bearing member to position the pipe in relatively vertical direction, and means mounted on the frame and connected to said bearing member for moving it laterally to position the pipe in a relatively horizontal direction.

7. In a tool of the class described, the combination of a vertically disposed frame having legs spaced apart and a cross member at its top, a screw member swivelly mounted on the cross member and depending therefrom between said frame legs, a chain having a series of roller bearings looped downwardly from said screw for suspending a pipe for rotation on said bearings, means for operating said screw to raise or lower the pipe, and a second screw swivelly mounted on the frame and connected to said chain for shifting the pipe laterally.

8. In a pipe-handling tool of the character described, the combination of a standard comprising legs and a top member rigidly connected together and adapted to straddle the pipe to be handled, a hanger member swively mounted on said frame top member for universal movement, a flexible loop member detachably connected to said hanger member and adapted to embrace the pipe to be handled, and an adjusting device connected between the standard and the hanger member for adjustably shifting the hanger member horizontally about this swivel mounting on the standard.

9. In a pipe-handling tool of the character described, the combination of a standard comprising legs and a top member rigidly connected together and adapted to straddle the pipe to be handled, a hanger member swively mounted on said frame top member for universal movement, a flexible loop member detachably connected to said hanger member and adapted to embrace the pipe to be handled, and anti-friction rollers carried by said flexible member in contact with the pipe for permitting the pipe to be rotated about its axis in said flexible member.

10. In a pipe-handling tool of the character described, the combination of a standard comprising legs and a top member rigidly connected together and adapted to straddle the pipe to be handled, a hanger member swively mounted on said frame top member for universal movement, a flexible loop member detachably connected to said hanger member and adapted to embrace the pipe to be handled, anti-friction rollers carried by said flexible member in contact with the pipe for permitting the pipe to be rotated about its axis in said flexible member, and means connected between said hanger member and said standard for horizontally shifting the pipe to an adjusted position.

11. In a pipe-handling tool of the character described, the combination of a standard comprising legs and a top member rigidly connected together and adapted to straddle the pipe to be handled, a hanger member swively mounted on said frame top member for universal movement, a flexible loop member detachably connected to said hanger member and adapted to embrace the pipe to be handled, and means connected between said hanger member and said standard for horizontally shifting the pipe to an adjusted position, said means being adaptable to the universal movement of said hanger member.

12. In a tool of the class described, the combination of a supporting frame, a chain loop suspended in said frame for supporting a pipe in the bight thereof, means for raising or lowering the loop for adjusting the relative position of the pipe in a vertical direction, means for shifting the loop laterally for adjusting the pipe in a horizontal direction, and means for preventing relative horizontal movement between said laterally shifting means and the pipe in the loop.

13. In a device of the class described for aligning pipe preparatory to welding together length thereof, the combination of a standard adapted to be supported on the ground, a pipe supporting member having means upon which the pipe is freely rotatable on its own axis and means connected with said standard and said pipe supporting member for adjusting the said supporting member vertically and horizontally with respect to said standard to align the pipe with a like supported pipe.

14. In a pipe handling device of the character described, the combination of a frame adapted to be supported upon the ground and arranged to straddle the pipe to be handled; a pipe-supporting mechanism suspended from said frame and having bearing means upon which the pipe is freely rotatable about its axis; and means carried by the frame and connected to said pipe supporting mechanism for raising and lowering and laterally shifting said pipe supporting mechanism relatively to the standard for aligning the pipe with a like suspended pipe for the purpose of positioning said pipes to be joined.

15. In a pipe handling device of the character described, the combination of a frame adapted to be supported upon the ground and arranged to straddle the pipe to be handled; a pipe-supporting mechanism suspended from said frame and having bearing means upon which the pipe is freely rotatable about its axis, means carried by said frame and connected to the pipe-supporting mechanism for suspending the pipe-supporting mechanism in the frame and for raising and lowering said pipe-supporting mechanism, and a device connected between the frame and the pipe-supporting mechanism for horizontally adjusting the pipe-supporting mechanism relatively to the frame.

16. In a pipe handling mechanism of the class described, the combination with a standard supportable on the ground, a pipe supporting mechanism, a screw suspending said pipe-supporting mechanism in said standard, means cooperating with the screw for raising and lowering the pipe-supporting mechanism with respect to the standard, a horizontally disposed screw connected between the pipe-supporting mechanism and said standard and means cooperating with said screw for shifting the pipe-supporting mechanism horizontally.

17. In a pipe handling mechanism of the class described, the combination with a standard supportable on the ground, a pipe supporting mechanism, a screw suspending said pipe-supporting mechanism in said standard, means cooperating with the screw for raising and lower the pipe-supporting mechanism with respect to the standard, a horizontally disposed screw connected between the pipe-supporting mechanism and said standard and means cooperating with said screw for shifting the pipe-supporting mechanism horizontally, the connection between the horizontal screw and the standard being adjustable in said standard to adapt it to the position to which the pipe-supporting mechanism is vertically adjusted.

18. In a pipe handling mechanism of the class described, the combination with a standard supportable on the ground, a pipe-supporting mechanism, a screw suspending said pipe-supporting mechanism in said standard, means cooperating with the screw for raising and lowering the pipe-supporting mechanism with respect to the standard, a horizontally disposed screw connected between the pipe-supporting mechanism and said standard and means cooperating with said screw for shifting the pipe-supporting mechanism horizontally, said pipe supporting mechanism including a pipe-supporting member adaptable to different sized pipe and having bearings upon which the pipe is freely rotatable about its axis.

19. In a pipe handling mechanism of the class described, the combination with a standard supportable on the ground, a pipe-supporting mechanism, a screw suspending said pipe-supporting mechanism in said standard, means cooperating with the screw for raising and lowering the pipe-supporting mechanism with respect to the standard, a horizontally disposed screw connected between the pipe-supporting mechanism and said standard and means cooperating with said screw for shifting the pipe-supporting mechanism horizontally, said pipe-supporting mechanism including a flexible chain member adaptable to conform to different pipe diameters and having a plurality of bearing members on which the pipe is rotatable.

20. In a pipe handling mechanism of the class described, the combination with a standard supportable on the ground, a pipe-supporting mechanism, a screw suspending said pipe-supporting mechanism in said standard, means cooperating with the screw for raising and lowering the pipe-supporting mechanism with respect to the standard, a horiozntally disposed screw connected between the pipe-supporting mechanism and said standard and means cooperating with said screw for shifting the pipe-supporting mechanism horizontally, said pipe-supporting mechanism including a supporting head and a chain loop suspended therefrom in which the pipe is supported, rolling bearing carried by said chain loop for permitting the rotation of the pipe in said loop, and means carried by said supporting member and adapted to bear upon the upper side of the pipe in the loop to prevent relative lateral movement of the pipe and the supporting member.

21. In a pipe handling mechanism of the class described, the combination with a standard supportable on the ground, a pipe supporting mechanism, a screw suspending said pipe-supporting mechanism in said standard, means cooperating with the screw for raising and lowering the pipe-supporting mechanism with respect to the standard, a horizontally disposed screw connected between the pipe-supporting mechanism and said standard and means cooperating with said screw for shifting the pipe-supporting mechanism horizontally, and a guide on the standard for said cooperating means, upon which said cooperating means is vertically adjustable to adapt it to the position to which the pipe-supporting mechanism is adjusted.

In witness that I claim the foregoing I have hereunto subscribed my name this 13th day of August, 1930.

JOHN HENERY OWENS.